Figure 1:
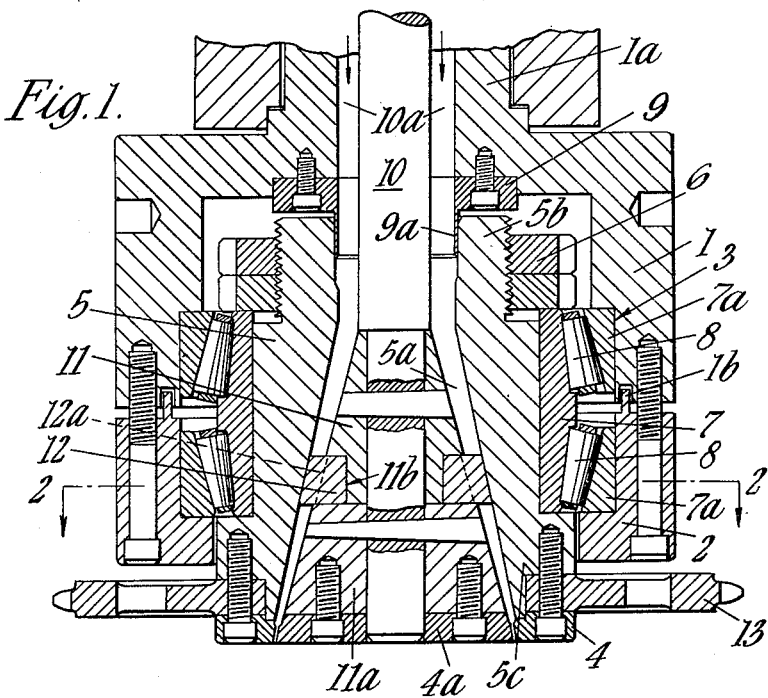

Sept. 4, 1962  F. B. MERCER  3,051,989
APPARATUS FOR EXTRUDING TUBULAR PLASTIC PRODUCTS
Filed March 1, 1960

INVENTOR
FRANK BRIAN MERCER
BY Francis H. Deef
ATTORNEY

United States Patent Office 3,051,989
Patented Sept. 4, 1962

3,051,989
APPARATUS FOR EXTRUDING TUBULAR
PLASTIC PRODUCTS
Frank Brian Mercer, Blackburn, England, assignor to Plastic Textile Accessories Limited, Blackburn, England
Filed Mar. 1, 1960, Ser. No. 12,020
Claims priority, application Great Britain Mar. 10, 1959
5 Claims. (Cl. 18—14)

This invention relates to apparatus for extruding plastic for manufacturing tubular products in the form of plain or ribbed sheeting or in the form of net or net-like fabrics through coaxial extrusion die means or die-carrying members (hereinafter referred to in general as "die means") which during extrusion are given relative rotary motion in a direction transverse to that of extrusion, such as described in my patent specification No. 2,919,467, patent specification Serial No. 837,854, now abandoned, and divisional patent specification Serial No. 805,003, now abandoned.

In apparatus of the above character considerable stress is imposed upon the shaft or like mounting for the inner of said coaxial die means, especially when working with those plastics which require high extrusion pressures such as might be liable to cause distortion of the said mounting means or to disturb the truth of the coaxial relative motion of the die means, and particularly where such die means do not operate in slideway contact with one another (as instanced in the case of my patent specification Serial No. 805,003).

The object of the present invention is to provide means for relieving this stress and for additionally ensuring the truth of the coaxial relative motion of the said extrusion die means or die-carrying members.

The invention consists in providing sliding bearing means supplemental to such bearing means for the shaft or like mounting as are external to the extrusion chamber, located within said chamber suitably adjacent to the plane of the extrusion die means with ducted means for passing plastic from one side of said bearing to the other.

In the preferred form the supplementary bearing means comprise a ducted circular bearing member extending at right-angles to the axis of die means and shaft mounting and cooperating in sliding contact with the walling of the extrusion member or a coaxial complementary annular bearing member thereon.

It is also preferred to provide the outer of the coaxial die means mounting or extrusion chamber walling, where the outer die means or chamber have rotary motion, with oppositely disposed tapered roller bearing means of known type between the chamber or mounting for the outer die means and the fixed casing housing such.

A further feature of the apparatus consists in a thin-walled elastic sleeve sealing member extending between the casing or other fixed support and the outer walling of the extrusion chamber or mounting of the outer die means, the arrangement being such that pressure of the plastic serves to expand the elastic sleeve into sealing contact with the said outer walling or die means mounting.

By the term "plastic" is meant an organic plastic capable of extrusion through dies which, without limitation of the generality of the term, includes for example plastics such as polythene, polyvinylchloride, cellulose acetate and viscose, or nylon.

The term "rotary motion" as used herein means continuous rotation of one die member or of both die means in opposite directions or both die means in the same direction but at differential rates, and includes in the case of apparatus for the production of net or net-like fabric partial rotation or oscillatory rotary relative motion of the die means.

The accompanying drawings exemplify means for carrying out the invention applied to apparatus as described in each of the specifications as specified above and wherein the die means are diagrammatically represented without illustrating the specific form of the die means of the particular apparatus of the several to which the invention may be applied.

Figure 2:
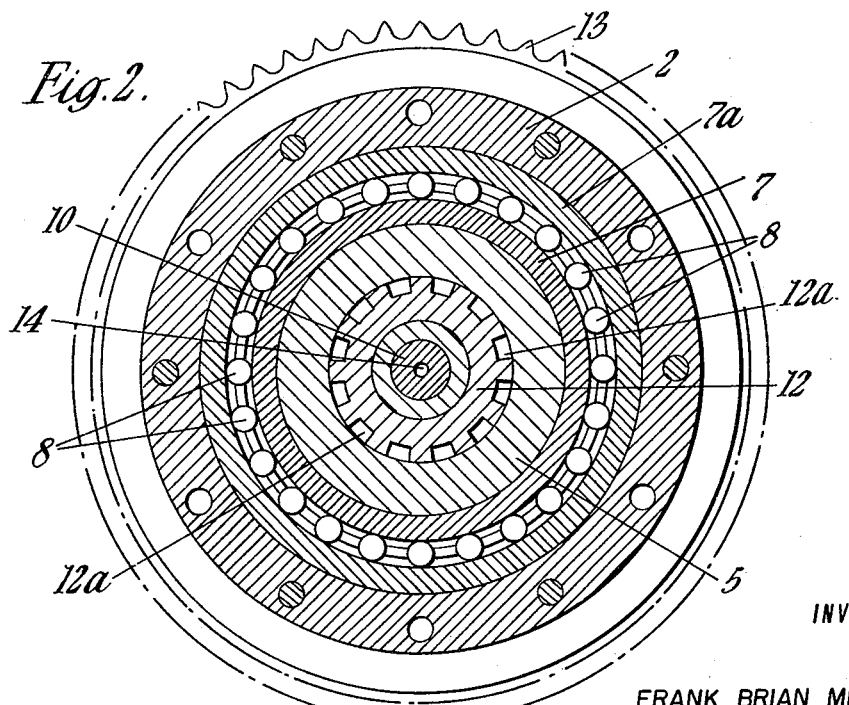

In the accompanying drawings:
FIGURE 1 is a vertical sectional elevation of the lower part of extrusion apparatus according to one form of the invention.
FIGURE 2 is a sectional plan taken on the line 2—2 of FIGURE 1 looking in the direction of the arrows.

In carrying the invention into effect as described by way of example as applied to extrusion apparatus of the character indicated in any of the above-mentioned patent specifications, and where both the inner and the outer coaxial die means are mounted for rotary motion, a fixed casing in two parts 1 and 2 secured together by set screws or the like has a taper bearing-receiving recess 3 on its inward side and a portion 1a extending upwardly to form a chamber or capacity for receiving plastic under forced feed or pressure maintained in any suitable known manner and having at its upper end a housing for a stuffing-box or sealed bearing for a central shaft or mounting for die means as described below.

The coaxial die means comprise an outer annulus 4 and an inner disc 4a. The annulus 4 is detachably secured to rotatable mounting means 5 which serves both for supporting the annulus 4 and as the outer wall of a conically walled extrusion chamber 5a. The upper end of the member 5 has a screwthreaded neck 5b on which a pair of locknuts 6 are threaded. The exterior surface of the member 5 has a rebate in which oppositely coned inner races 7 are seated, the outer races 7a being located in the recess 3. Taper bearing rollers 8 are located between the races 7 and 7a and the inner race members 7 are secured by the locknuts 6.

Between the members 1 and 2 of the casing a labyrinth packing 1b is provided to prevent the outward escape of grease from the taper roller bearing.

The rotatable die mounting member 5 is sealed with respect to the casing part 1 by a phosphor bronze or other sealing device 9 which has a thin downwardly depending skirting 9a contacting with the interior surface of the neck 5b. The pressure of the plastic in the extrusion chamber 5a and its upper part 10a serves to expand the skirting 9a into sealing contact with the neck and prevent escape of plastic or loss of pressure within the extrusion chamber.

A central shaft 10 carries the disc die means 4a on a two-part conical piece or head 11, 11a, the die means 4a being detachably secured to the portion 11a of the conical head. This conical part 11 (or 11a) is rebated at 11b for the reception of a supplementary bearing member 12 fixed between the parts 11 and 11a of the conical head.

The outer surface of the (preferably phosphor bronze) supplementary bearing member 12 has its outer surface machined or ground to the same conical angle as the interior coned surface of the member 5 and is adapted to have a sliding contact therewith during the relative rotation between the shaft 10 and the member 5. Instead of contacting directly with the wall of the member 5 the bearing member 12 may contact with a complementary rubbing strip or band let into the wall of the member 5. The bearing member 12 is adapted to support and maintain the coaxial truth of the shaft 10, and annulus 4 and disc 4a, particularly where the adjacent surfaces or edges thereof do not contact with or slide upon one another, and with this in view the bearing 12 is located as close to the die means as is convenient.

The angle of the exterior conical surface of the members 11, 11a, are at a less steep angle than the interior conical surface of the member 5 so that the annular chamber 5a between these parts tapers towards the die means 4, 4a.

In order that the plastic within the upper part of the extrusion chamber 5a fed from the plastic supply extension above it may have free access to the portion of the chamber below the bearing member 12 and such that the feed of plastic may be continuous to the die means 4 and 4a, the member 12 is provided with a series of throughway ducts or grooves 12a. Alternatively, passages or ducts may be formed in the interior wall of the member 5 to by-pass the slideway surface of the bearing member 12.

The shaft at its upper end passes through a stuffing-box and bearing and carries suitable gear means whereby rotation may be communicated to the shaft and ultimately to the disc die means 4a, not shown in the present figures but illustrated and described in the patent specifications numbered as above. The outer annular die means 4 mounted on the member 5 is driven with the member 5 by means of a chain wheel or other gear 13 conveniently located in a rebate 5c in the member 5.

In applying the invention to sheet-producing apparatus where ballooning of the extruded plain or ribbed sheet is intended, the shaft 10 has a coaxial bore or longitudinal duct(s) 14 through which compressed air or gas is delivered to the tubular sheet extruded through the die means 4, 4a.

Any suitable means (electrical or otherwise) may be provided for heating the plastic chamber member 5 and the supply through the neck 1a; also heating means may be provided for the conical parts 11, 11a.

The die means 4 and 4a may be according to any of the above-identified specifications, that is to say, the die members 4 and 4a may have net-forming dies extruding strands and integral intersections according to patent specification No. 2,919,467; or they may have ribbed tubular sheeting forming dies according to patent specification Serial No. 805,003 (divided from Patent No. 2,919,467) wherein the die members are out of sliding contact with one another and have an annular slot or clearance between them (for extruding tubular sheeting) with die grooves or passages through the die members for simultaneously extruding strands or ribs on opposite sides of the extruded sheeting; or the die members 4 and 4a may be according to patent specification Serial No. 837,854 wherein the members have slideway surfaces in contact with one another adjacent an annular sheet-extruding slot with strand- or rib-extruding dies traversing the members from the plastic supply side to the extrusion side thereof with or without feed ducts through said slideway surfaces for supplementing the supply of plastic to the annular sheet-extruding slot, or, again, the members 4 and 4a may have a contacting slideway zone having ducts feeding plastic therethrough to an adjacent plain surfaced annular slot for extruding unribbed sheeting in tubular form.

Each of the forms of die members 4 and 4a described above has the coaxial shaft on which the inner die member 4a is mounted provided with the supplemental bearing 12 cooperating with a bearing surface on the walling 5 of extrusion chamber 5a and is calculated to assist in maintaining the die members 4, 4a, truly coaxial.

Although the die means 4, 4a, have been described above in reference to the rotation of both die means it is to be understood that either may be stationary while the other rotates, and where it is chosen that the die means 4a is to be stationary the extrusion chamber member 5 and die means 4 may be locked by any suitable means, or alternatively the member 5 may be built as part of the stationary casing 1 and 2. Similarly, where the die means 4 is to rotate and the die means 4a is to be stationary, means may be provided for locking the shaft 10 or building the apparatus with a shaft which is fixed.

I claim:

1. In plastic extrusion apparatus adapted for the extrusion of continuous tubular structures comprising, in combination, a plastic supply chamber adapted to contain plastic under pressure, a casing enclosing said chamber, shafting traversing said chamber, a disc-like die member carried coaxially on said shafting, an annular die member coaxial with said disc-like die member and mounted in association with the supply chamber walling, the two members being out of contact with one another to afford an unobstructed annular extrusion slot, and means for imparting relative rotational displacement between the shafting with its disc-like die member and the annular die member, the provision of bearing means fixed upon the shafting outside the supply chamber at the supply end thereof, and supplemental sliding contact bearing means within the supply chamber adjacent the said die members but spaced therefrom and exposed to the plastic therein with a complementary bearing surface for said supplemental sliding bearing on the interior chamber walling, and communicating means for the flow of plastic between the plastic supply side of said supplemental bearing and the other side towards said die members, both bearing means being on one and the same side of said die members.

2. Plastic extrusion apparatus as claimed in claim 1 wherein said communication means comprise throughway apertures in said sliding contact bearing means.

3. In plastic extrusion apparatus adapted for the extrusion of continuous tubular structures comprising, in combination, a plastic supply chamber adapted to contain plastic under pressure, a casing enclosing said chamber, shafting traversing said chamber, a disc-like die member carried coaxially on said shafting, an annular die member coaxial with said disc-like die member and mounted in association with the supply chamber walling, the two members being out of contact with one another to afford an unobstructed annular extrusion slot, and means for imparting relative rotational displacement between the shafting with its disc-like die member and the annular die member, the provision of bearing means fixed upon the shafting outside the supply chamber at the supply end thereof, and supplemental sliding contact bearing means within the supply chamber adjacent the said die members but spaced therefrom and exposed to the plastic in said supply chamber, said sliding bearing means having a conical periphery, the interior of said chamber walling having a complementary bearing surface in sliding contact with said periphery, and said periphery having grooves providing communication between the plastic supply side of said sliding bearing and the other side thereof, both bearing means being on one and the same side of said die members.

4. A plastic extrusion apparatus as claimed in claim 3 wherein the shafting has a two-part conical head carrying the disc-like die member and has the sliding contact bearing means located between said parts of the head.

5. A plastic extrusion apparatus as claimed in claim 3 wherein the walling of the supply chamber carrying the annular die member has inner roller races on the exterior of said chamber walling and outer roller races on the said casing and two sets of oppositely disposed taper rollers between the races on the chamber and those on the casing.

References Cited in the file of this patent

UNITED STATES PATENTS

| | | |
|---|---|---|
| 1,993,349 | Parkhurst | Mar. 5, 1935 |
| 2,415,887 | Joy | Feb. 18, 1947 |
| 2,919,467 | Mercer | Jan. 5, 1960 |